Nov. 18, 1947.　　　　R. E. CROWLEY　　　　2,430,975
MEANS FOR RECORDING MOVING OBJECTS
Filed March 10, 1945　　　　3 Sheets-Sheet 1
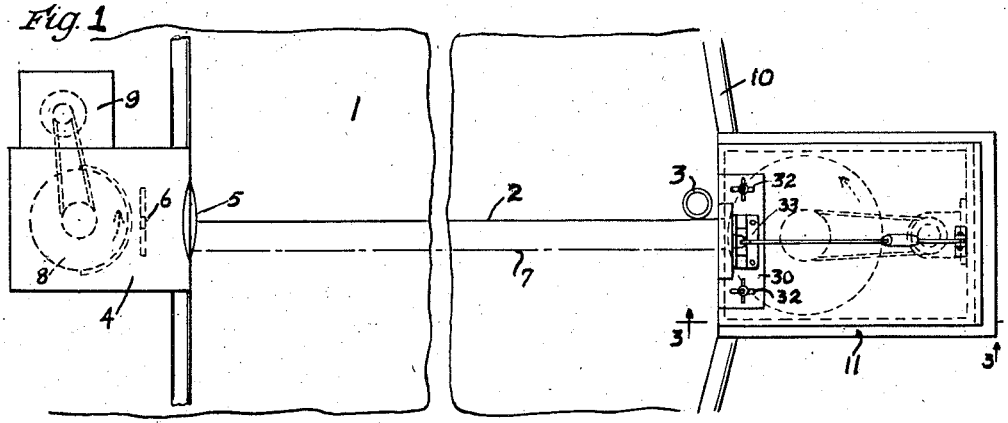
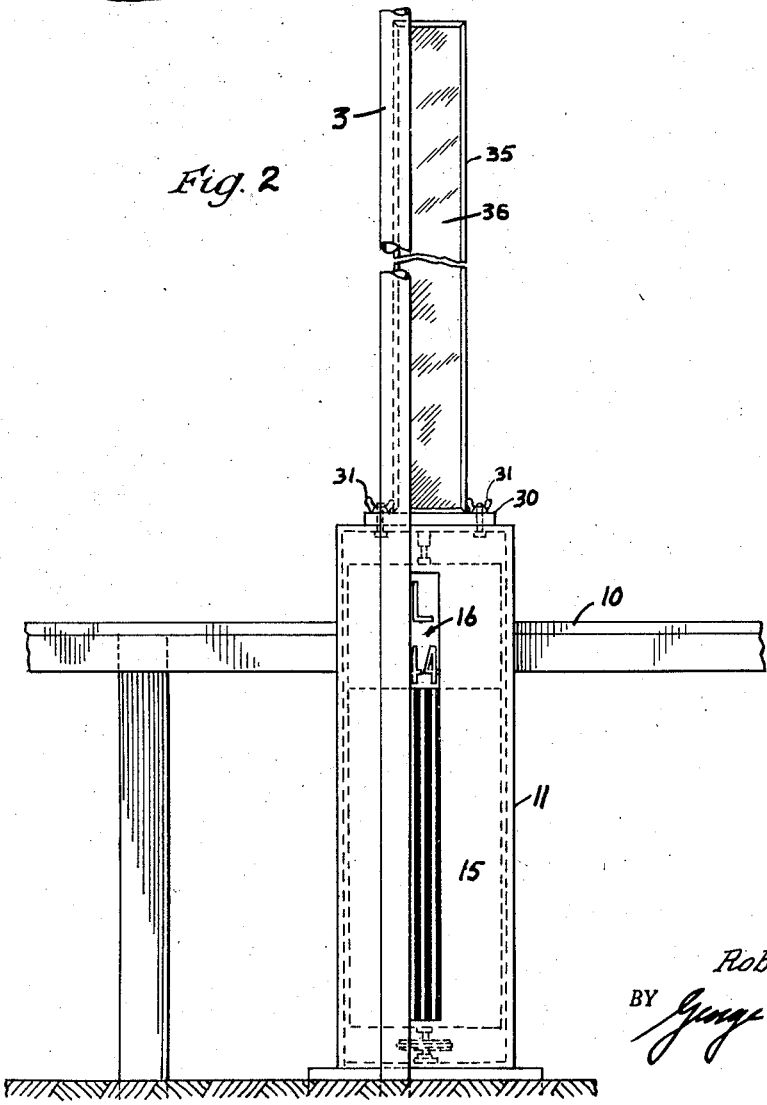
INVENTOR.
Robert E. Crowley
BY George H. Simmons
Atty.

Nov. 18, 1947.   R. E. CROWLEY   2,430,975
MEANS FOR RECORDING MOVING OBJECTS
Filed March 10, 1945   3 Sheets-Sheet 2
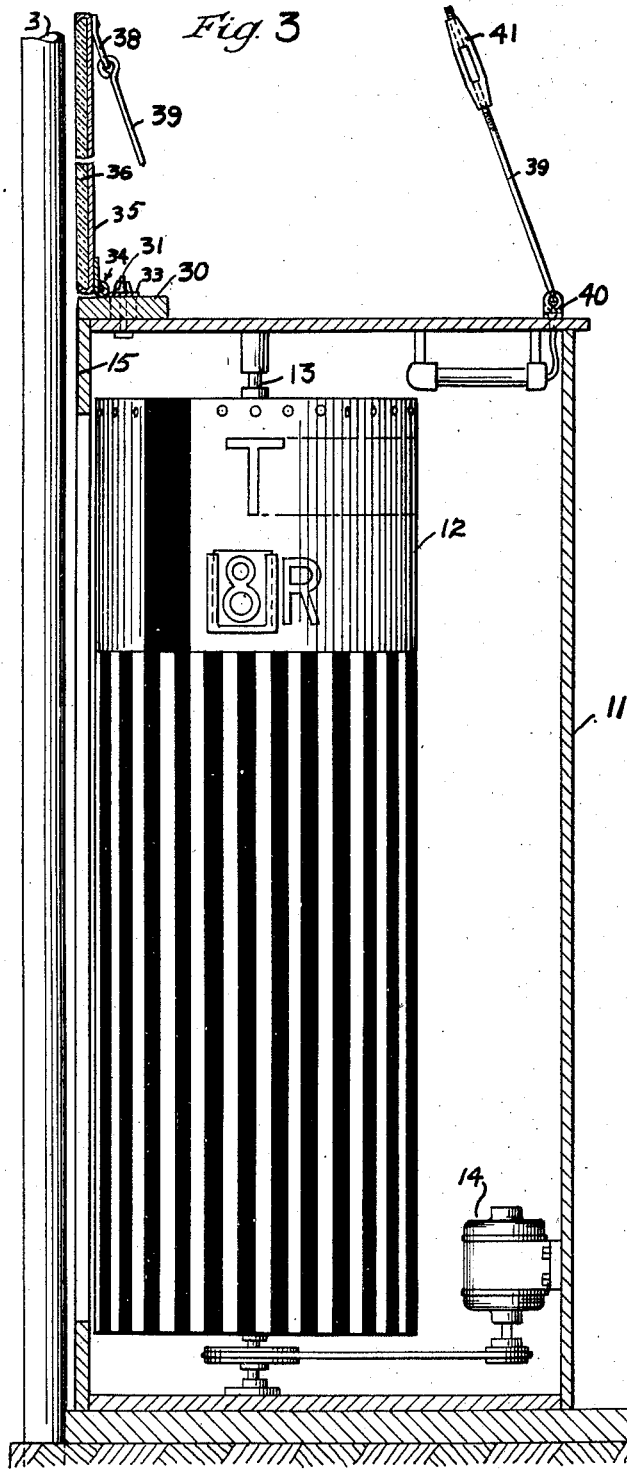
INVENTOR.
Robert E. Crowley
BY George H. Simmons
Atty.

Nov. 18, 1947. R. E. CROWLEY 2,430,975
MEANS FOR RECORDING MOVING OBJECTS
Filed March 10, 1945 3 Sheets-Sheet 3

INVENTOR.
Robert E. Crowley
BY George H. Simmons
Atty.

Patented Nov. 18, 1947

2,430,975

UNITED STATES PATENT OFFICE 2,430,975

MEANS FOR RECORDING MOVING OBJECTS

Robert E. Crowley, Jamaica, N. Y.

Application March 10, 1945, Serial No. 582,109

2 Claims. (Cl. 95—11)

This invention relates to a method and means for recording moving objects passing over a given line, and has for its principal object the provision of a new and improved method of and means for making such a record.

It is a main object of the invention to provide a method of and means for recording moving objects passing over a given line when such objects are so bunched together as to be not clearly distinguishable to the naked eye.

Another object of the invention is to provide a method of and means for recording objects moving over a given line by simultaneously recording direct images of the object and reflected images of the object.

Still another object of the invention is to provide a recording system capable of more accurately timing the intervals between the movement of the first and succeeding objects over a given line.

Further objects of the invention not specifically mentioned here will be apparent from the detailed description and claims which follow, reference being had to the accompanying drawings in which a preferred embodiment of the invention is shown by way of example and in which:

Figure 1 is a plan view of the apparatus;

Figure 2 is a front elevational view of a part of the apparatus shown in Figure 1;

Figure 3 is a cross sectional view taken substantially along the line 3—3 of Figure 1 looking in the direction of the arrows and drawn to an enlarged scale;

Figure 5:
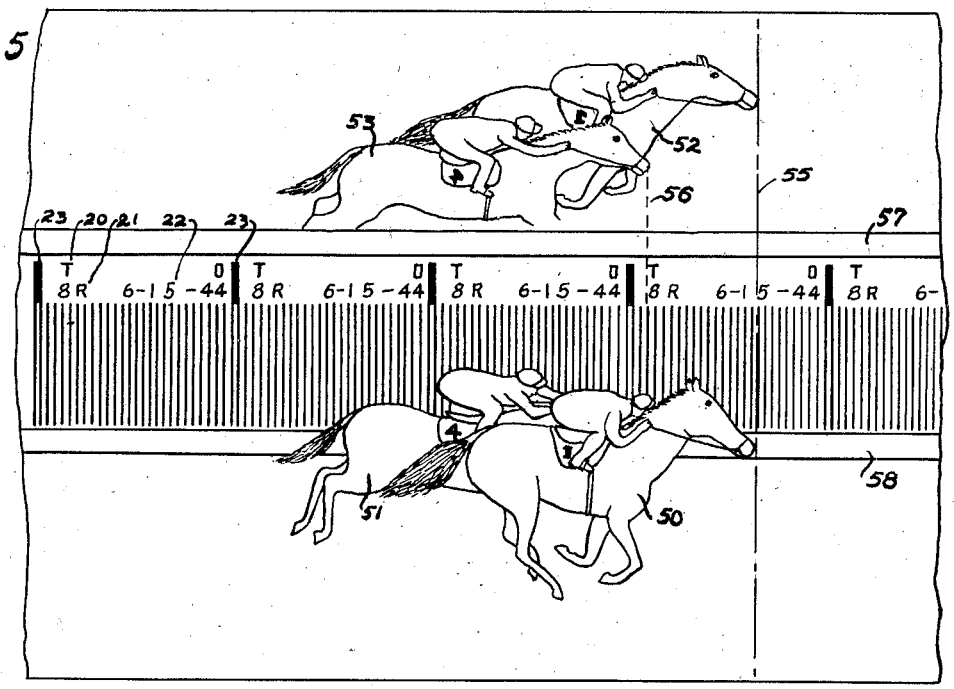
Figure 5 is a diagrammatic view showing the record made by the device.

In my co-pending application, Serial No. 459,078, filed September 21, 1942, now Patent No. 2,403,911, issued July 16, 1946, there is shown a method of and apparatus for recording moving objects passing over a given line, of which application the instant invention may be said to be an improvement.

In many instances such as the finish of a horse race, for example, the contestants passing over the line are oftentimes badly bunched together, and therefore it is difficult to tell the precise order in which the various contestants reach the finish line. If, for example, a horse on the camera side of the track is slightly ahead of one or two other horses who are on the side of the leading horse away from the camera, the leading horse will screen the other horses from the view of the camera and it will be difficult to determine which of the other two horses actually reached the finish line first. The present invention seeks to remedy this condition.

In an installation at a race track, for example, the camera for recording the finish of the race is located above the finish wire and at one end thereof, usually at the outside of the track. The timing device of my co-pending application is located beneath the finish line and at the inside rail of the track. The camera is stopped down so as to limit its field of vision to a narrow band across the track, bounded on the one side by the finish line and extending down track therefrom. The timing device is masked so as to be visible only through a narrow slit-like opening having a width approximately equal to the width of the field of vision of the camera. With this arrangement the camera records the contestants as they cross the finish line and no contestant which has not actually crossed the line will be recorded on the film.

In accordance with the teachings of the present invention a planar mirror is mounted above the timing device at the inside edge of the track. This mirror has a width approximately equal to the field of vision of the camera and is disposed with one of its edges in line with the finish line. The mirror is set precisely at right angles to the finish line and serves to reflect into the camera images of the sides of the horses away from the camera. By this arrangement a horse that is shielded from the camera by another horse running between it and the camera will be clearly visible in the images reflected by the mirror into the camera, and a more accurate record of the finish of the race is recorded by the camera, even when the contestants are badly bunched together.

In my prior co-pending application a timing indicia is moved across the field of vision of the camera at stated intervals, usually one-tenth of a second. In order to compute the time elapsing between the times of a first and a succeeding horse, it has been necessary to interpolate between successive timing marks on the film. In order to provide a quicker way of obtaining this time interval and in fulfillment of an object of the present invention the timing device employed herein is equipped with a main timing indicia which is moved across the field of vision of the camera at stated intervals as before, and in addition a plurality of sub-indicia sub-dividing this stated interval of time are also moved across the field of vision of the camera with a result that the film records indicia indicating much smaller units of time than has been possible heretofore.

Referring now to the drawings in more detail—as will be seen in Figure 1 the track 1 is provided with a finish wire 2 that is supported on suitable posts 3 and extends across the track at a safe distance thereabove. The camera 4 is located at the outside edge of the track and with the optical axis of its lens 5 in the vertical plane through the finish wire 2. A suitable masking means or aperture 6 limits the field of vision of the camera to a narrow band extending between the finish line and an imaginary line 7 that is substantially parallel thereto. The camera includes a film holder 8 and motor means 9 through which the film is moved continuously past the aperture during an operation of the camera.

Located at the opposite end of the finish wire and inside of the inside rail 10 of the track, is a cabinet 11, Figures 1, 2 and 3, in which a timing drum 12 is journaled for rotation by a vertical axis 13. The cabinet also contains suitable means, such as a motor 14, for driving the drum at a uniform rate of speed.

The front face 15 of the cabinet is located adjacent to the track and contains a rectangular window 16, one edge of which is disposed in the vertical plane through the finish wire and the other edge of which is disposed at or near the other edge of the field of vision of the camera. The direction of rotation of the drum is such that points on the surface thereof move from left to right across window 16 in Figure 2, and the diameter of the drum is preferably such that the speed of such points is approximately equal to the speed of the objects as they cross the field of vision of the camera.

Figure 4:
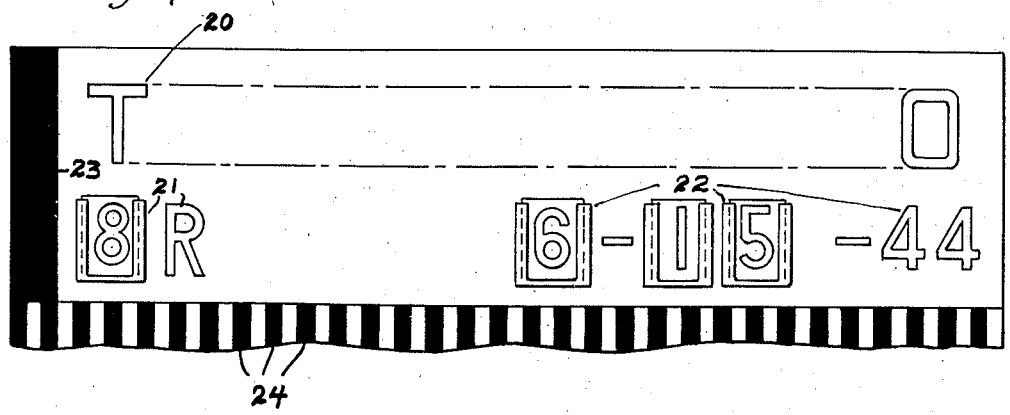
Figure 4 is a fragmentary view of the timing means drawn to an enlarged scale.

As will be seen in Figures 3 and 4 the outer surface of the drum 12 carries a legend 20, indicating the name of track, legends 21 indicating the number of the race and legends 22 indicating the month, day and year of the race. These legends located at the top of the drum are in juxtaposition to a main timing indicia 23. As the drum is rotated the legends and timing indicia move across the window 16 which is located in the field of vision of the camera. If the drum is rotated at a speed of 600 R. P. M., which is 10 R. P. S., timing indicia 23 will appear before the window 16 at one-tenth of a second intervals. Extending downwardly from the main timing indicia and legends are a plurality of bands or ribbons 24 which, as shown, have a width approximately equal to one-third of the width of the main timing indicia 23. As shown in Figure 4 there are 31 of these bands 24 and since each will move across the window 16 during the interval between successive appearances of the main indicia 23 at the window, a band 24 will be visible at intervals of one-three hundred tenth of a second in the embodiment shown in the drawings by way of example. Obviously, by varying the number of bands 24 any desired sub-division of tenths of a second can be achieved. The bands 24 and indicia 20—23 move from left to right, Figure 2.

As will be seen in Figures 1, 2 and 3, a mounting plate 30 is fixed upon the top of the cabinet 11 by suitable means such as wing nuts 31 projected through the top of the cabinet and through suitable slots 32 in the mounting plate 30. Secured to the mounting plate 30 is one side 33 of a hinge 34. The other side of this hinge is secured to a mirror frame 35, thereby to mount the mirror frame upon the cabinet for movement around a horizontal axis. The mirror frame 35 contains a suitable planar mirror 36 which, as will be seen best in Figure 2, has a width substantially equal to the field of exposure of the camera and a length sufficient to reflect the entire width of the track 1 into the camera, as will presently appear. The mirror 36 is disposed with its vertical edges substantially coinciding with the field of vision of the camera. In the example shown in the drawings the finish wire 2 is located on the down track side of the post 3 and the post 3 is disposed in front of the cabinet and mirror serving to mask the edge of the mirror so that no images of objects on the track are reflected by the mirror until those objects move under the finish wire. Since a certain amount of light reflected from the objects on the track into the camera by the mirror will be lost in the mirror, if desired the mirror may be slightly wider than the window 16 thereby to lengthen the exposure of the reflected images on the film. The part of the field of vision of the camera receiving the reflected images will of course have to be made to correspond to the width of the mirror to produce this effect.

As will be seen in Figure 3 a suitable bracket 38 is located at the top of the frame 35. A brace rod 39 extends from the bracket 38 to a similar bracket 40 located at the back edge of the cabinet. Rod 39 is provided with a turn buckle 41 that is operable to swing the mirror around the horizontal axis of hinge 34, thereby to locate the image reflected by the mirror in a direction at right angles to the edge of the film.

As is well understood by those skilled in the art, the angle of incidence equals the angle of reflection in a planar mirror, and therefore it is necessary that the mirror 36 be set at right angles to the vertical plane through the finish line in order to bring the image reflected by the mirror onto the film into proper alignment longitudinally of the film with respect to the direct images of the objects on the film. If, for example, the mirror is out of true in one direction the images reflected thereby will appear on the moving film ahead of the direct images of the object and if the mirror is out of line the other way the reflected images will trail behind the direct images on the film. Wing nuts 31 and slots 32 permit limited rotation of the mirror around a vertical axis, thereby enabling it too be set at right angles to the vertical plane through the finish wire and when this setting is achieved, wing nuts 31 can be tightened down to maintain the setting.

Referring now to Figure 5 there is shown a print of the record obtained by the apparatus hereinbefore described. The timing indicia 23 appears substantially along the median line of the film and serves to frame successive appearances of the legends 20—22. Timing bands 24 appear beneath these legends. The direct images 50 of contestant #1 and 51 of contestant #4 appear at the lower side of the film and in front of the indicia 24. Contestant #1 is shown as the winner, contestant #4 is second, and it will be noted that the head and shoulders of this latter contestant are completely hidden in this direct view by contestant #1. The images reflected into the camera by mirror 36 appear at the top of the film, the reflected image of contestant #1 being shown at 52, and the reflected image of contestant #4 at 53. It will be noted that the head and shoulders of contestant #4 are clearly visible in the reflected image 53. Since the mirror 36 is at right angles to the vertical plane containing the finish wire, reflected image 52 is aligned with respect to image 50 and a test mark 55 disposed at right angles to the edge of the film will touch corresponding points of both images of the contestant. By projecting a working line 56 along one of the timing bands 24 to the nose of the reflected image 53 and counting the bands between lines 55 and 56, the time elapsing between the passing of the first and second contestants under the finish wire can be determined. In the example there are 15 lines 24 between the working lines 55 and 56, meaning that $15/310$ of a second elapsed between the two crossings of the finish line. Obviously, the embodiment shown by way of example results in an inconvenient fraction of time, and in actual practice a more convenient number of bands 24 will be employed.

As shown in Figure 5 the reflected images 52 and 53 are located down on the film, that is toward the median line thereof, so far that the feet and most of the legs of contestant #4 are not visible. The position of the reflected images 52 and 53 vertically in Figure 5 can be adjusted by a manipulation of the turn buckle 41 to rotate the mirror 36 around the horizontal axis of hinge 34. Turning the turn buckle in one direction will move the images upwardly in Figure 5 and in the opposite direction will move the images downwardly. So long as the mirror is set so that a contestant running at the extreme inside or the extreme outside of the track 1 will be reflected into the camera by the mirror 36 as that contestant crosses the finish line, the particular setting of the mirror around this horizontal axis is a matter of convenience in locating the reflected images 52 and 53 on the film.

As will be noted in Figure 5, the reflected images of the numerals 1 and 4 carried by the contestants are reversed by the mirror. This emphasizes that the images 52 and 53 are reflected images. If desired the numerals carried by the contestants to be reflected into the camera may be made in reverse so that the images of them recorded on the film will be normal numerals. The film also carries a ribbon-like band 57 disposed immediately above the indicia 23. This band is the image of the cabinet directly above the window 16 blurred by the movement of the film. By painting this portion of the cabinet a color to match with the track, this band will become relatively indistinct and will not distract from the record. A similar band 58 appears beneath the indicia 24.

The record on the film proves the accuracy of the setting of the equipment. As in my co-pending application proof of the coincidence of the field of vision of the camera with the window 16 and hence with the finish line is evidenced by the full exposure of indicia 24—24. Proper alignment of mirror 36 is determined by the relative positions of the direct and reflected images on the film. Any variation from these correct settings and alignments will be clearly discernible from the record on the film.

The present invention is possessed of many advantages. It employs simple devices which can be constructed in a sturdy manner and maintained in perfect operating condition at low cost. It provides an accurate record of the crossing of various contestants across the finish line when those contestants are badly bunched together. It provides an extremely accurate method of timing the interval between a first and succeeding contestants.

While I have chosen to show my invention by illustrating and describing a preferred embodiment of it I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent, is pointed out in the appended claims.

What is claimed is:

1. In a system for recording and timing objects moving over a specific line in sequence, a camera located at one end of said line with its optical axis disposed in the vertical plane through said line, a film in said camera, means for limiting the field of view of said camera to a narrow band which is bounded on one side by said line, a drum mounted for rotation around a vertical axis located on said line on the side of the objects away from said camera, main timing indicia on the top of said drum, secondary timing indicia on said drum and beneath said main indicia, means for rotating said drum to move said main indicia across said band at timed intervals and in the same direction as and at the same speed as said objects move across the band and to move said secondary indicia across the band to indicate subdivisions of said intervals, means in said camera for projecting onto said film direct images of said objects and indicia as they move across the band which means locates the images of the objects adjacent to one edge of the film and the images of the indicia substantially on the median line thereof, a planar rectangular mirror mounted above said drum at right angles to said plane and with one edge disposed in said plane, said mirror reflecting into said camera means images of the sides of said objects away from said camera, means for adjusting said mirror to cause said camera means to project said reflected images onto said film on the side of said indicia images opposite to the direct images of the objects, means for moving said film in the same direction as and at the same speed as the images move to expose the film and record the images thereon, thereby to permit timing the interval between two objects by counting the main and secondary indicia intervening between the direct and/or reflected images of the objects.

2. A system as claimed in claim 1 characterized in that the mounting for said mirror is adjustable to move the mirror around a vertical axis to insure that its plane will be disposed precisely at right angles to the vertical plane through said line.

ROBERT E. CROWLEY.

REFERENCES CITED

The following references are of record in the file of this patent:

UNITED STATES PATENTS

| Number | Name | Date |
| --- | --- | --- |
| 2,320,350 | DelRiccio | June 1, 1943 |
| 2,403,911 | Crowley | July 16, 1946 |

FOREIGN PATENTS

| Number | Country | Date |
| --- | --- | --- |
| 106,521 | Australia | Jan. 27, 1939 |